United States Patent [19]
Wyle et al.

[11] 4,077,161
[45] Mar. 7, 1978

[54] CUT-OFF MACHINE

[75] Inventors: Frank S. Wyle, Los Angeles, Calif.; Edward F. Keiter, Toledo, Ohio

[73] Assignee: Wyle Laboratories, El Segundo, Calif.

[21] Appl. No.: 708,100

[22] Filed: Jul. 23, 1976

[51] Int. Cl.² .................. B24B 27/06; B24B 55/04; B26D 1/18
[52] U.S. Cl. .............................. 51/98 R; 51/268; 83/168; 83/398; 83/477.2
[58] Field of Search ............... 51/98, 99, 268, 269, 51/2 Z; 125/14; 83/486.1, 488, 471.2, 477.2, 397–399, 168, 581, 487

[56] References Cited
U.S. PATENT DOCUMENTS

| | | | |
|---|---|---|---|
| 2,353,590 | 7/1944 | Schutz | 51/98 R |
| 2,354,509 | 7/1944 | Dreher | 51/98 R |
| 2,365,987 | 12/1944 | Zimmerman | 83/487 |
| 2,511,563 | 6/1950 | Bullard | 51/98 R |
| 2,787,092 | 4/1957 | Smith | 51/98 R |
| 3,386,322 | 6/1968 | Stone | 83/488 |
| 3,487,863 | 1/1970 | Buckley | 83/581 |
| 3,606,701 | 9/1971 | Fauot | 51/98 R |
| 3,653,702 | 4/1972 | Frimberger | 51/268 X |
| 3,946,631 | 3/1976 | Malm | 83/488 |

Primary Examiner—James L. Jones, Jr.
Assistant Examiner—Nicholas P. Godici
Attorney, Agent, or Firm—Fay & Sharpe

[57] ABSTRACT

A cut-off machine includes a housing having a top surface with an elongated slot therethrough. A rotatable cutting disc is mounted within the housing for raising and lowering movement through the slot to cut workpieces supported on the top surface. Elevating means is selectively operable for moving the cutting disc in raising and lowering directions. Clamp means on the top surface clamps workpieces thereagainst for cutting by the disc. A cover moves between open and closed positions for selectively covering the clamp means and the top surface in outwardly-spaced relationship thereto. Slot blocking means beneath the top surface moves between blocking and unblocking positions for selectively blocking movement of the disc upwardly through the slot. Selective operation of control means for the elevating means is also dependent upon safety control means operated by all of the cover, clamp means and slot blocking means. Before the elevating means can be operated for moving the disc upwardly through the slot, the cover must be closed, the clamp means must be clamped, and the slot blocking means must be in its unblocking position. Adjustable hydraulic means controls the rate of movement of the elevating means in its raising direction.

32 Claims, 15 Drawing Figures

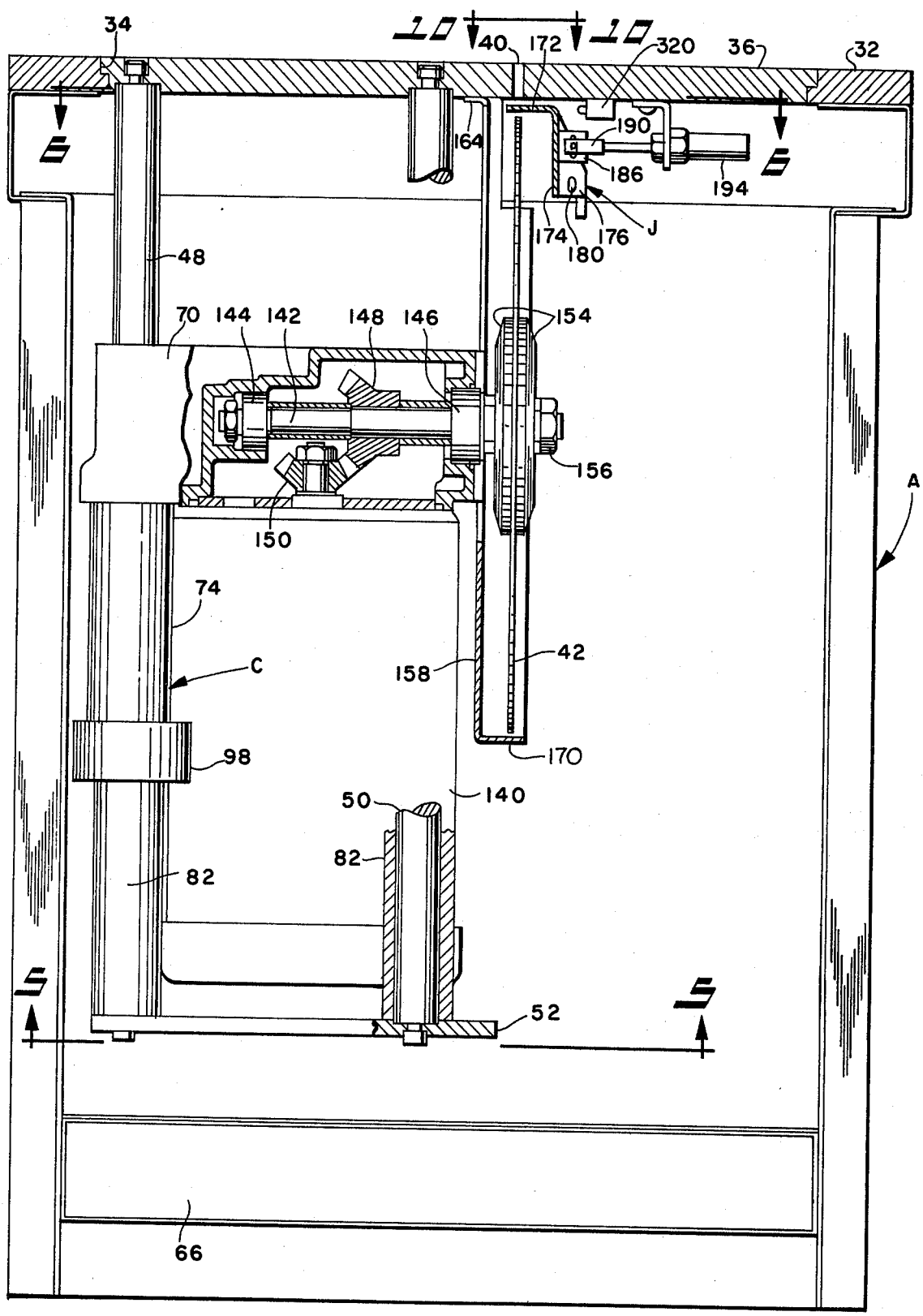

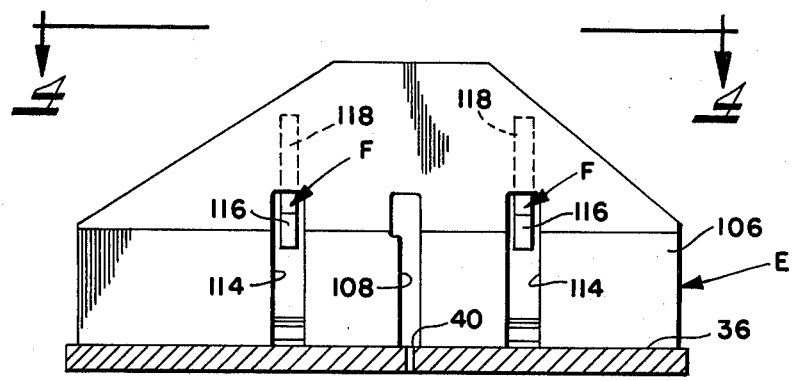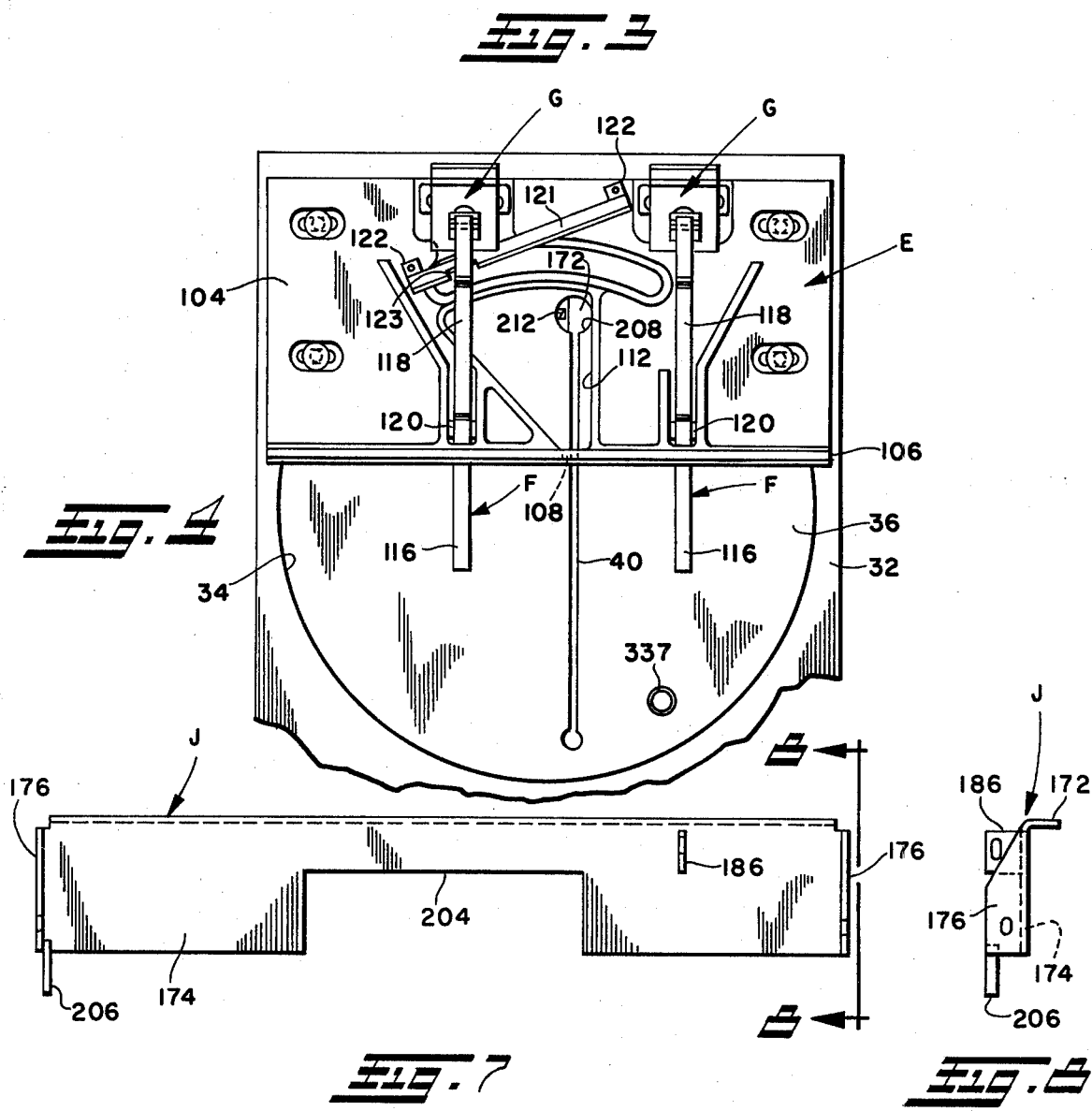

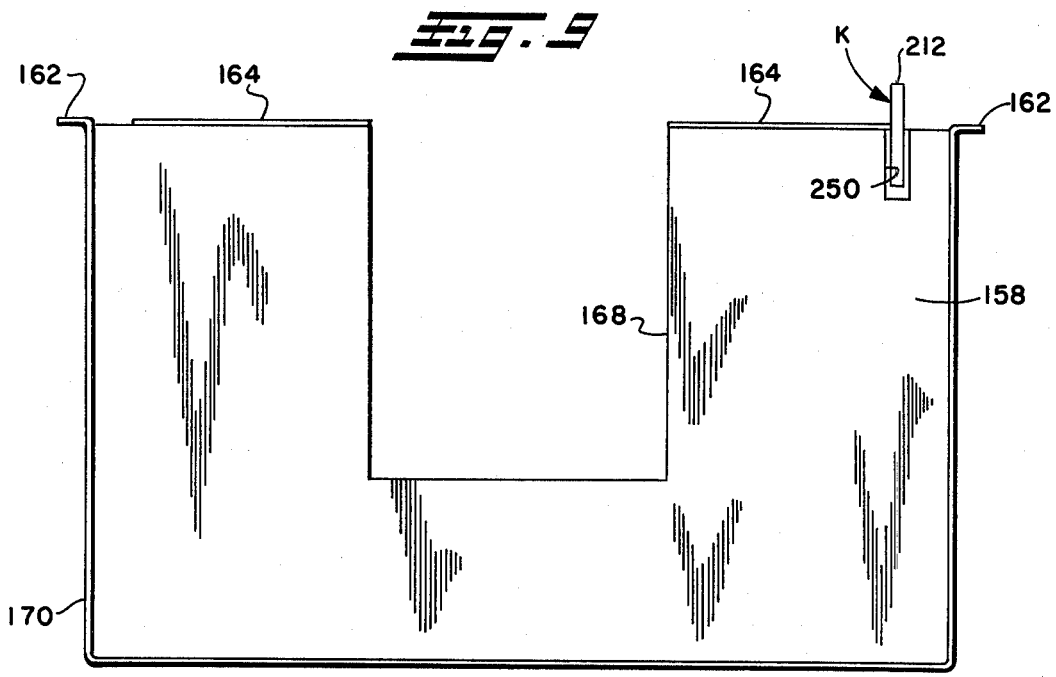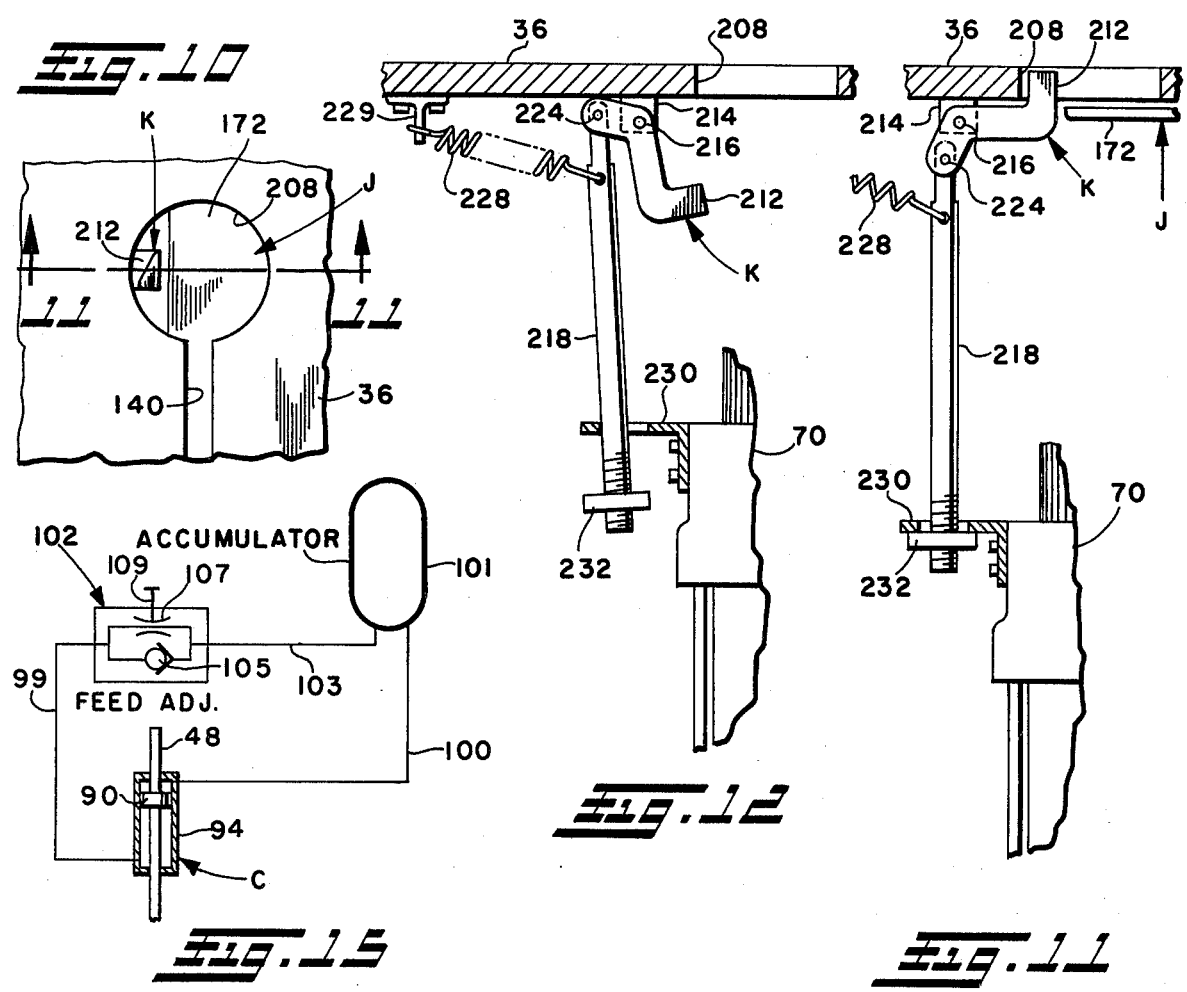

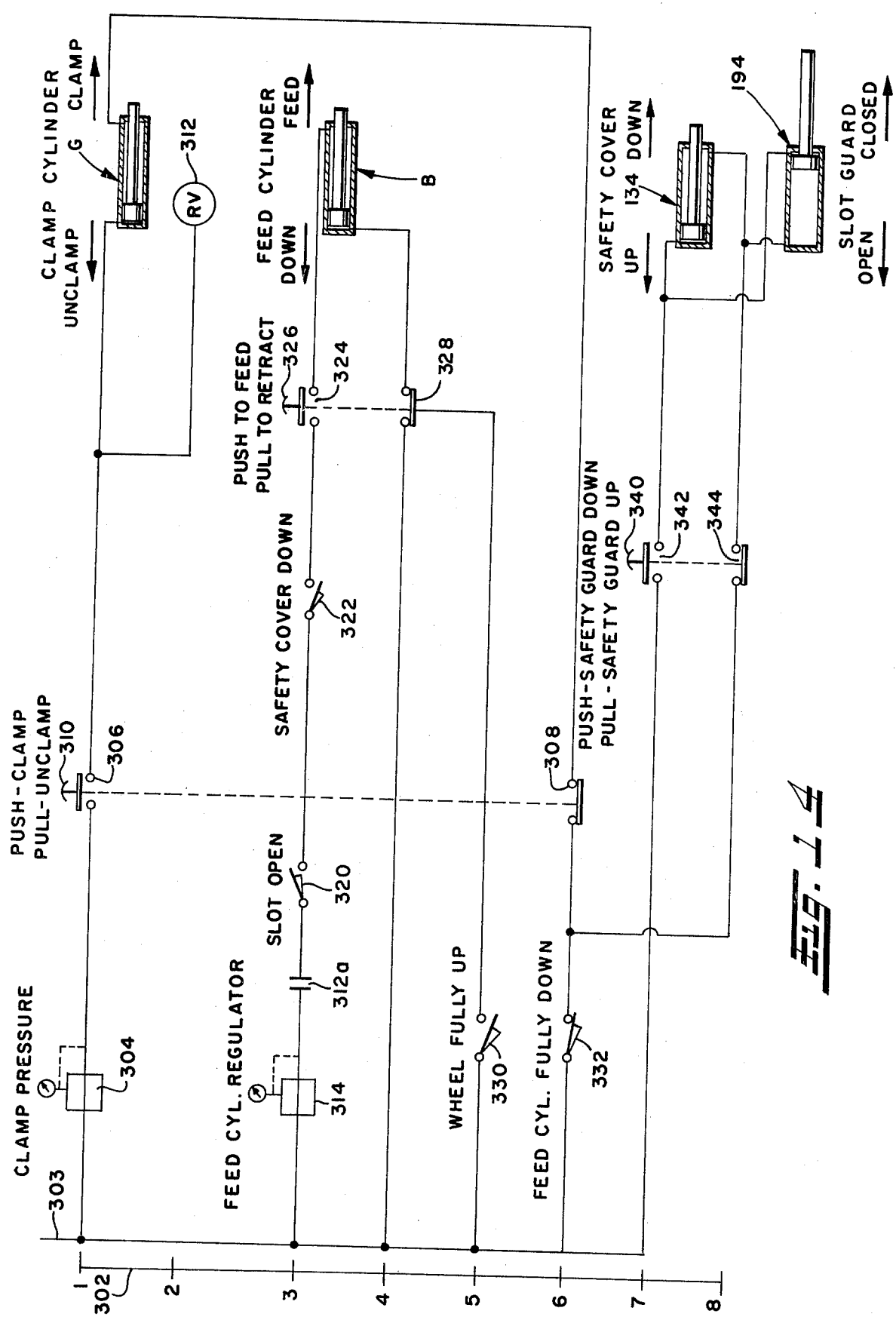

CUT-OFF MACHINE

BACKGROUND OF THE INVENTION

This application relates to the art of cutting devices and, more particularly, to power operated cutting devices of the type wherein a cutting disc moves upwardly through an elongated slot in a top surface of a housing.

The invention is particularly useful with cut-off machines using an abrasive cutting disc. However, it will be appreciated that the invention has broader aspects and may be used in other cutting machines.

Conventional abrasive cut-off machines are extremely noisy, and create a shower of hot sparks and high velocity particles during operation. The abrasive disc occasionally disintegrates while rotating at a very high angular velocity and flying particles create a significant safety hazard. Operators of such machines are often actually in fear of the machines.

Cutting machines are known wherein a rotatable cutting disc moves upwardly through an elongated slot in a top surface of a housing. However, previous cutting machines of this type have not been completely enclosed for minimizing noise, and have not been completely provided with interlock safety controls in a simplified manner.

SUMMARY OF THE INVENTION

An abrasive cut-off machine of the type described provides maximum safety for the operator by confining the shower of hot sparks and the occasional disintegrating cutting disc inside of the machine. The noise level developed by the machine is also significantly reduced and can be used by an operator without fear of being injured.

The cut-off machine includes a housing having a top surface with an elongated slot therethrough, and a rotatable cutting disc is mounted within the housing for raising and lowering movement through the slot. Elevating means is selectively operable for moving the disc in raising and lowering directions.

Clamp means is provided for clamping workpieces on the top surface for being cut by the cutting disc. The clamp means is movable between first and second positions respectively corresponding to clamping and unclamping positions.

A cover is provided for the top surface and the clamp means, and is movable between first and second positions respectively corresponding to closed and opened positions. In its closed position, the cover surrounds the clamp means and slot in outwardly-spaced relationship thereto.

Slot blocking means is movably mounted beneath the top surface, and is movable between first and second positions respectively corresponding to slot unblocking and slot blocking positions.

Selectively operable elevating means moves the cutting disc in its raising or lowering direction. Safety control means is movable between open and closed positions for respectively preventing and permitting operation of the elevating means. The safety control means is automatically placed in its closed position by movement of the cover, clamp means and slot blocking means to their first positions. The safety control means is automatically moved to its open position by movement of the cover, clamp means or slot blocking means to their second positions. Therefore, operation of the elevating means to move the cutting disc in a raising direction can take place only when all of the various safety devices are in their proper positions.

Adjustable rate control means provides adjustable control of the rate of movement of the elevating means in its raising direction. The rate control means may take many forms and in a preferred arrangement includes a hydraulic cylinder from which hydraulic fluid is forced at a predetermined rate through an adjustable needle valve.

Adjustable automatic reversing means provides adjustment of the distance the elevating means is raised before being automatically reversed for movement in a lowering direction.

In one arrangement, a plurality of spaced-apart vertical rods extend downwardly beneath the top surface. The elevating means includes a carrier for the cutting disc, and is supported for raising and lowering movement on the rods. The carrier includes double acting fluid cylinders surrounding the rods, and pistons are fixed to the rods within the cylinders. Pressurized fluid supply means selectively supplies pressurized fluid to the cylinders on either side of their pistons, while fluid is bled from the other side of the pistons. The fluid cylinders for raising and lowering the carrier are preferably pneumatic, and an additional hydraulic damping cylinder is provided on the carrier surrounding another rod for damping upward movement of the carrier. The housing preferably includes a base, and the rods have terminal bottom ends spaced above the housing base. The bottom terminal ends of the rods are connected together by rod connecting means which maintains the rods in parallel spaced-apart relationship, and connects the rods so they stiffen and support one another transversely. The top surface includes a rotatable plate to which the top ends of the rods are attached so that rotation of the plate also moves the elevating means and cutting disc. If so desired, the rod connecting means can be pivotally connected to the housing base for pivotal movement about a common vertical axis with the top plate.

In a preferred arrangement, position control means is movable between open and closed positions for respectively preventing movement of the clamp means and cover means to their second positions from their first positions, and permitting movement of the clamp means and cover means to their second positions from their first positions. The position control means is in its closed position when the elevating means is in its lowermost position, and is in its open position when the elevating means is out of its lowermost position. This arrangement prevents opening of the cover or release of the clamp means while the cutting disc is still projecting upwardly through the slot in the top surface.

A cutting disc guard is mounted in depending relationship from the underside of the top surface on one side of the slot, and is located between the cutting disc and its carrier. This guard minimizes damage to the carrier and drive motor by a disintegrating cutting disc, or by particles thrown downwardly through the slot.

In one arrangement, the cover has opposite sides located on opposite sides of the slot, and the sides have bottom side edges. Workpiece openings are formed in the opposite sides extending upwardly from the bottom side edges. Upwardly movable doors are provided for closing the openings and varying the height thereof. An arrangement of this type provides an automatic adjustment for different sizes of workpieces extending through the sides of the cover on the top surface. The movable doors for the side openings minimizes the size of the side openings through the cover so that noise is minimized along with the possibility of particles being thrown outwardly from the cover.

In another aspect of the invention, an enlarged hole is formed through the top surface at one end of the slot, and the cutting disc rotates in a direction for throwing cuttings toward the hole. The cuttings tend to build up and bridge the hole, so kicker means is provided for moving upwardly and downwardly through the hole to break caked cuttings therefrom. The kicker means may take many forms and may include a kicker member pivotally mounted for movement upwardly through the hole. In a preferred arrangement, movement of the kicker means is responsive to movement of the elevating means so that movement of the elevating means in a raising direction withdraws the kicker means downwardly and away from the hole, while final movement of the elevating means to its lowermost position causes rapid movement of the kicker means upwardly through the hole.

The clamp means on the top surface may take many forms, and includes an L-shaped clamp support having a generally horizontal leg secured to the top surface and an upright leg extending upwardly therefrom. The clamp support is located with the upright leg extending across the slot adjacent one end thereof. An upwardly extending vertical opening in the upright leg aligned with the slot accommodates the cutting disc when it moves upwardly through the slot. Clamp arms are pivotally connected to the clamp support on opposite sides of the slot, and have forward end portions extending outwardly from the upright leg for movement toward and away from the top surface. Rear end portions on the clamps arms are located on the opposite side of the upright leg from the forward end portions, and fluid cylinders connected between the horizontal leg of the support and the rear end portions of the arms selectively pivot the arms to move their forward ends toward or away from the top surface. The clamp arms are preferably pivotally connected to the clamp support by arm pivot connections which are adjustable vertically and horizontally for selectively varying the location of the forward end portions of the arms and their movement path to clamp workpieces of various sizes and shapes.

Spark guards and deflectors are provided for protecting various parts of the apparatus and minimizing wear.

It is a principal object of the present invention to provide an improved abrasive cut-off machine which provides maximum safety for an operator by substantially eliminating hot sparks and the danger of flying particles from a disintegrating cutting disc.

It is also an object of the present invention to provide an improved cut-off machine which is completely enclosed during operation so that the noise and flying particles are substantially reduced or eliminated.

It is also an object of the present invention to provide an improved cut-off machine having various safety controls integrated with the selectively operable controls so that the machine cannot be operated unless all of the safety devices are in their proper positions.

It is a further object of the present invention to provide a cut-off machine with an adjustable elevating rate control means for adjustably controlling the rate at which the cutting disc moves upwardly through a workpiece.

It is an additional object of the present invention to provide an improved cut-off machine having a kicker for preventing the build up of cuttings over one end of the slot through which the cutting disc passes.

It is another object of the invention to provide an improved elevating means for elevating a cutting disc in a cut-off machine.

It is an additional object of the invention to provide an improved cut-off machine having slot blocking means for selectively blocking the slot against upward movement of a cutting disc therethrough, and blocking the slot against movement of particles of a disintegrating cutting disc therethrough.

It is also an object of the invention to provide a cut-off machine with an improved adjustable automatic reversing means for adjusting the distance through which a cutting disc is raised before automatic reversal takes place for movement of the disc in a lowering direction.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 2 is a cross-sectional elevational view taken generally on line 2—2 of FIG. 1;

FIG. 3 is a front elevational view taken generally on line 3—3 of FIG. 1;

FIG. 4 is a partial top plan view taken generally on line 4—4 of FIG. 3 and with a spark deflector omitted for clarity of illustration;

FIG. 7 is a partial elevational view taken generally on line 7—7 of FIG. 6;

FIG. 8 is an end elevational view taken generally on line 8—8 of FIG. 7;

FIG. 9 is a partial elevational view taken generally on line 9—9 of FIG. 6;

FIG. 10 is a partial top plan view taken generally on line 10—10 of FIG. 2, and with the clamp means removed for clarity of illustrating another feature of the cut-off machine;

FIG. 11 is a partial cross-sectional elevational view taken generally on line 11—11 of FIG. 10;

FIG. 12 is a view similar to FIG. 11 and showing another operative position of a kicker mechanism;

FIG. 14 is a schematic pneumatic diagram illustrating the pneumatic control circuit used with the cut-off machine of FIGS. 1–13; and, FIG. 15 is a schematic hydraulic circuit showing an adjustable rate control arrangement used with the cut-off machine of FIGS. 1–14.

DESCRIPTION OF A PREFERRED EMBODIMENT

Figure 1:
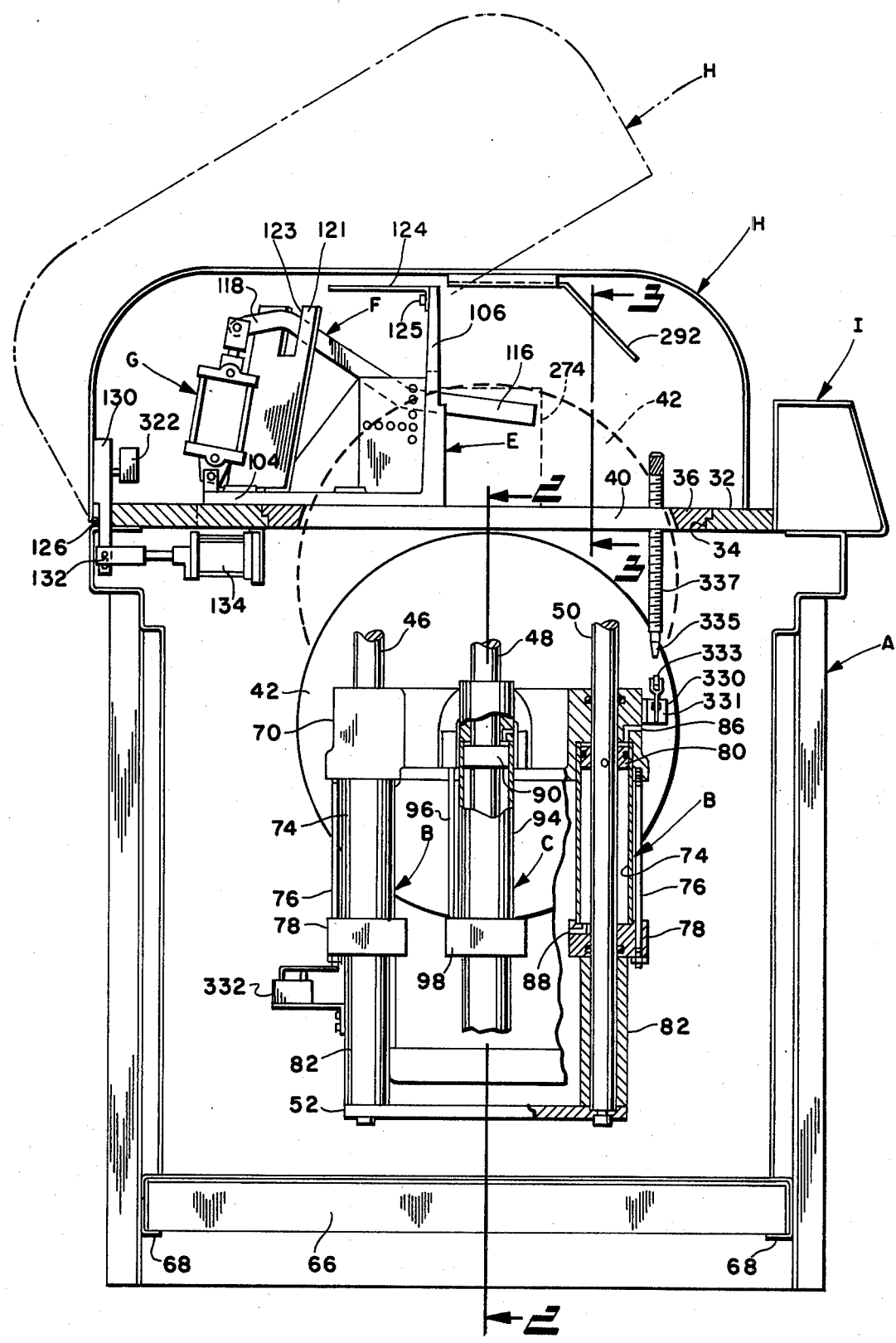
FIG. 1 is a cross-sectional side elevational view of a cut-off machine constructed in accordance with the present invention, and with other portions further cut-away for clarity of illustration.
Figure 5:
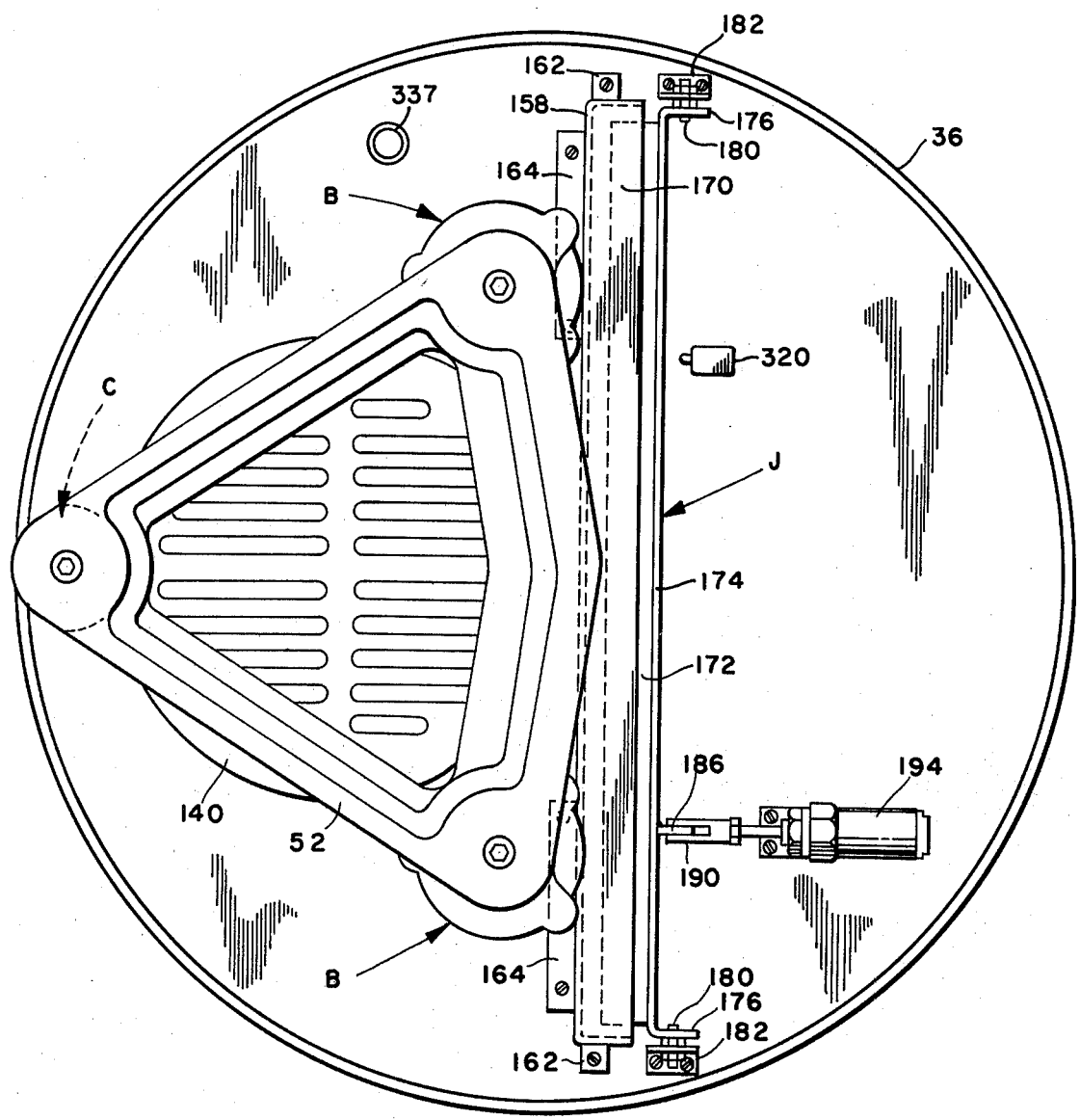
FIG. 5 is a view looking upwardly from the bottom of FIG. 2 generally on line 5—5 of FIG. 2 and with portions omitted for clarity of illustration.
Figure 6:
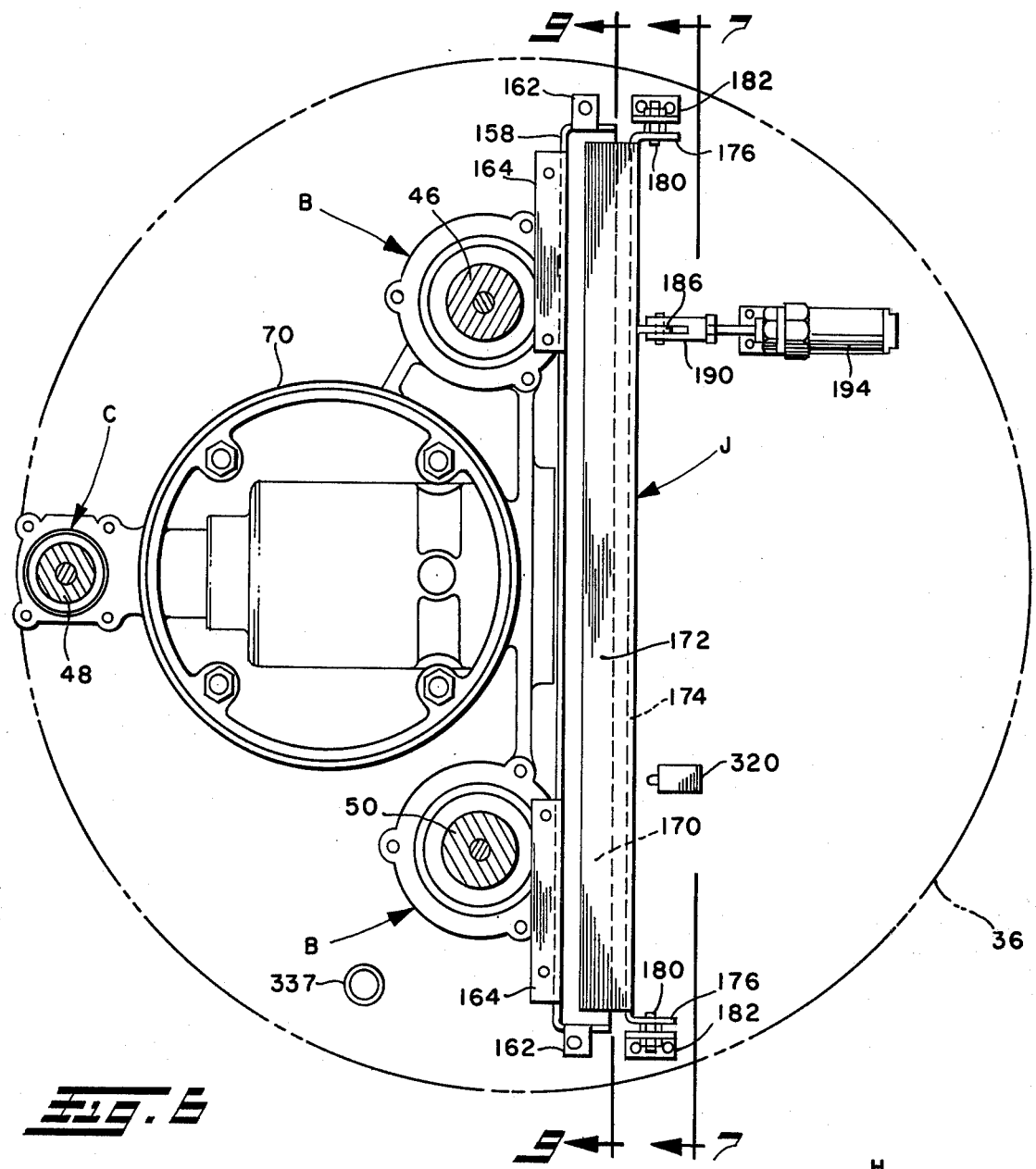
FIG. 6 is a cross-sectional top plan view taken generally on line 6—6 of FIG. 2 and with portions omitted for clarity of illustration.

Referring now to the drawings wherein the showings are for purposes of illustrating the preferred embodiment of the invention only and not for purposes of limiting same, FIG. 1 shows an abrasive cut-off machine including a housing A in the form of a generally rectangular metal cabinet having readily removable or openable panels at least at the opposite sides thereof for access to the interior of the housing. Obviously, suitable controls may be provided for the openable or removable panels so that the machine cannot be operated while being worked upon for repairs or the like.

Housing A includes a top surface 32 having a downwardly and inwardly stepped circular opening 34 therethrough rotatably receiving an outwardly stepped circular plate 36 for rotation about a vertical axis. Plate 36 is rotatable by operation of a manually operable control wheel in a known manner and rotation occurs about a vertical plate axis through the center of plate 36 to vary the angle at which a cut is made.

An elongated relatively narrow slot 40 extends through plate 36, and a rotatable abrasive cutting disc 42 is mounted within housing A for raising and lowering movement through slot 40. Workpieces supported on the top surface of housing A are cut by cutting disc 42 as it moves upwardly through slot 40.

A plurality of spaced-apart vertical rods 46, 48 and 50 are secured to plate 36 on one side of slot 40 and extend downwardly in parallel spaced-apart relationship to terminate at rod terminal bottom ends interconnected by a rod connecting means 52 which means 52 may simply comprise a casting having countersunk openings therethrough for receiving a bottom end of rods 46, 48 and 50, and receiving bolts which extend through the holes into suitable threaded bores in the bottom ends of the rods. For heavy duty machines, or to provide additional transverse support if so desired, rod connecting means 52 can be pivotally connected to a base portion of housing A by a bearing pin or the like for pivotal movement of rod connecting means 52 on a common vertical axis with plate 36. The bearing pin or the like would provide transverse support for all the rods. Without such a bearing pin, rod connecting means 52 itself helps the rods in stiffening one another and transversely supporting one another. In the arrangement shown, there are three rods 46, 48 and 50 located generally at the apices of a triangle.

A bottom drawer 66 may be removably mounted in the bottom portion of housing A on drawer slides 68 for receiving cuttings and dust which fall through slot 40.

The elevating means for selectively moving cutting disc 42 in raising and lowering directions includes a carrier 70 in the form of a casting having suitable bearing lined holes therethrough slidably receiving rods 46, 48 and 50. Rods 46 and 50 have double acting fluid cylinders B associated therewith and attached to carrier 70. Fluid cylinders B are preferably pneumatic and only one such cylinder will be described in detail for rod 50. A cylinder 74 suitably clamped to carrier 70 by bolt 76 and cylinder clamping member 78 surrounds a piston 80 fixed on rod 50 against movement relative thereto as by a pin or set screw. A spacer sleeve 82 is provided around the lower end portion of rod 50 between rod connecting means 52 and cylinder clamping member 78. Suitable elastomeric bumpers may be provided between member 78 and sleeve 42, and it is obvious that suitable seals are provided where necessary. Connections are provided as at 86 and 88 for selectively supplying high pressure air selective to either side of piston 80 within the cylinder 74. That side of piston 80 opposite from the side to which pressurized air is admitted is obviously bled to atmosphere so that carrier 70 is selectively raised and lowered. Admitting pressurized air through port 86 raises carrier 70, while admission of pressurized air through port 88 lowers carrier 70.

Hydraulic damping means is provided and may include a hydraulic cylinder C having a cylinder 94 secured to carrier 70 by bolts 96 and cylinder clamping member 98. Piston 90 is fixed to rod 48 against movement relative thereto and cylinder 94 is filled with hydraulic fluid.

As shown in FIG. 15, conduits 99 and 100 are connected with cylinder 94 on the opposite sides of piston 90. Conduit 100 communicates directly with an accumulator 101, while conduit 99 communicates with accumulator 101 through a valve 102 and a conduit 103. Valve 102 includes a ball check valve 105 which blocks fluid flow in a direction from conduit 99 to conduit 103 and freely allows fluid flow in the opposite direction. Valve 102 also includes a needle valve 107 having a manually operable adjustment stem 109 suitably located for ready access by an operator of the cut-off machine, such as on control panel I of FIG. 1. Adjustment of step 109 will vary the size of the passage through the needle valve 107 and this will vary the rate at which fluid may flow from conduit 99 to conduit 103 when a predetermined pressure is acting on the hydraulic fluid above piston 90. Thus, cylinder C defines an adjustable elevating rate control means for adjustably controlling the rate at which carrier 70 is raised by pneumatic cylinders B. This enables adjustment of the rate at which cutting disc 42 is fed through a workpiece. Hydraulic cylinder C minimizes bouncing of cutting disc 42 and its elevating means defined generally by carrier 70, and provides a more uniform constant pressure of the cutting disc on a workpiece. Ball check valve 105 allos rapid downward movement of cylinder C.

Clamp means for clamping workpieces to the top surface housing A includes a generally L-shaped clamp support E having a horizontal leg 104 bolted to top surface 32 and an upright leg 106 extending upwardly therefrom. Upright leg 106 extends across slot 40 adjacent one end thereof. An upwardly extending vertical opening 108 is provided in upright leg 106 and a triangular or somewhat pie-shaped opening 112 is provided in horizontal leg 104 in alignment with vertical opening 108. Openings 108 and 112 are in alignment with plate slot 40 so that a portion of cutting disc 42 may move upwardly through openings 108 and 112. Cutting disc 42 rotates counterclockwise in FIG. 1 so that cuttings are thrown mostly from right to left in FIG. 1 or toward the rear of housing A.

Spaced-apart vertical openings 114 in upright leg 106 of clamp support E on opposite sides of opening 108 have clamp arms F extending therethrough. The clamp arms F include forward end portions 116 extending outwardly from upright leg 106 on opposite sides of slot 40, and rear arm portions 118 located on the opposite side of upright leg 106 from forward end portions 116. Pneumatic cylinders G are connected between horizontal clamp support leg 104 and arm rear end portions 118 for selective operation to pivot the rear end portions of the arms upwardly or downwardly, and provide corresponding downward or upward movement of forward arm portions 116. Between their forward and rearward end portions, arms 116 are pivotally connected to clamp support E as at 120 at pivot connections which are selectively adjustably to a plurality of different horizontal or vertical positions as shown by the plurality of horizontal and vertical holes in FIG. 1 for adjusting the position of the forward end portions of the arms and their movement path. This adjustment arrangement makes it possible to clamp extremely thin workpieces directly against the top surface of plate 36, or to clamp much larger pieces at locations well above the top surface of plate 36. The arms F, and particularly their forward end portions 116, may be considered clamping means which is movable between first and second positions respectively corresponding to clamping and unclamping positions by selective operation of double acting pneumatic cylinders G.

As shown in FIGS. 1 and 4, a spark guard 121 in the form of a generally flat rectangular plate is positioned between triangular opening 112 and one of cylinders G. When plate 36 is rotatably adjusted for moving disc 42 into opening 112 where it will tend to throw sparks directly against the one cylinder G, such sparks are kept from striking the cylinder by guard 121. Suitable flanges 122 are provided at the bottom edge of guard 121 for receiving screws which thread into tapped holes in clamp support 104. Guard 121 also has a notch 123 in its upper edge for accommodating one arm F. Guard 121 is inclined about its bottom edge toward opening 112 and disc 42. Guard 121 has a height at least as great as cylinders G and is also positioned at a skew as shown in FIG. 4. That is, guard 121 extends at an acute angle to a vertical plane extending between and parallel to arms F in FIG. 4.

As shown in FIG. 1, a generally L-shaped spark deflector 124 is secured to the upper portion of upright leg 106 on clamp support E as by screws 125. Deflector 124 extends from leg 106 toward cylinders G above cutting disc 42 and may have a width sufficient to be located above disc 42 in all rotated positions of plate 36. Deflector 124 blocks sparks from striking cover H or bouncing therefrom toward cylinders G and this minimize wear.

A generally rectangular cover H is pivotally connected as at 126 to the rear of housing A for pivotal movement between first and second positions respectively corresponding to closed and opened positions. An arm member 130 suitably secured to the inside rear surface of cover H extends downwardly through an opening in the top of housing A and is connected as by a clevis connection 132 with a double acting pneumatic cylinder 134 which is suitably mounted to the underside of top surface 32 and is selectively operable for selectively raising or closing cover H. At the opposite side of housing A from that shown, another arm similar to arm 130 may be attached to cover H, and a very heavy spring connected to that arm instead of a fluid cylinder. The spring would normally apply tension to the other arm for normally holding the cover in its raised opened position. Therefore, the spring would hold the cover in its raised position in the absence of any air being supplied to cylinder 134. The spring can also be used simply as a counterbalance to aid cylinder 134 in raising cover H.

A suitable front control panel is generally indicated by letter I in FIG. 1 and would contain various manually manipulatable controls for manipulation by an operator to operate the device.

As best shown in FIG. 2, an electric motor 140 is suitably bolted to carrier 70 and is suspended therefrom between vertical rods 46, 48 and 50. Carrier 70 has a horizontal shaft 142 rotatably mounted therein as in bearings 144 and 146, and a gear 148 secured to shaft 142 drivingly engages gear 150 attached to the output shaft of motor 140. Cutting disc 42 is secured to the outer end of shaft 142 between disc clamping members 154 and nut 156.

As best shown in FIGS. 2, 5, 6 and 9, a generally rectangular dished metal guard 158 is secured to the underside of plate 36 on one side of slot 40. Plate 190 has top opposite end flanges 162 and side flanges 164 with suitable holes therethrough for freely receiving screws which thread into suitable tapped bores in the underside of plate 36. A central vertical slot in plate 158 receives the end portion of carrier 70 adjacent bearing 146 in FIG. 2 for free raising and lowering movement of carrier 70 extending to guard 158. Rectangular guard 158 is of a size and shape for completely surrounding disc 42 and includes a lateral peripheral flange 170 extending around three sides thereof. Guard plate 158 protects motor 140 and carrier 70, along with the fluid cylinders, from parts of a disintegrating cutting disc or other particles thrown downwardly within housing A.

Slot blocking means J comprises a generally L-shaped elongated member having a horizontal leg 172 and a vertical leg 174. End flanges 176 on vertical leg 174 extend outwardly therefrom in an opposite direction from horizontal leg 172. Suitable holes through flanges 176 receive pins 180 for pivotally connecting slot blocking means J to suitable brackets 182 secured to the underside of plate 36. An ear tab 186 having a vertical slot therein is connected as by clevis connection 190 with the rod of a pneumatic cylinder 194 suitably mounted to the underside of plate 36. Horizontal leg 172 is located within guard plate 158 at the top end thereof directly above cutting disc 42 and directly beneath slot 40 in plate 36. Operation of cylinder 194 to retract its rod will pivot blocking means J clockwise in FIG. 2 so that horizontal leg 172 moves to the right out of the path of disc 42 and to one side of slot 40.

Slot blocking means J is selectively movable between first and second positions respectively corresponding to unblocking and blocking positions by operation of cylinder 194. As best shown in FIG. 7, the central portion of vertical leg 174 is cut-away as at 204 so that disc mounting members 154 will easily clear vertical leg 174 in the pivoted unblocking position of blocking means J. Suitable stop means may be provided for stopping pivotal movement of blocking means J in its desired unblocking position. In one arrangement, an extension shown secured to one flange 176 at the left of FIG. 7 is identified by numeral 206 and will strike against the inner surface of guard plate 158 for holding blocking means J in its unblocking position where both horizontal leg 172 and vertical leg 174 will be clear of cutting disc 42 in its upward movement. Slot blocking means J blocks upward movement of particles of a disintegrating cutting disc while the cover is raised and an operator is positioning another workpiece on the machine.

As best shown in FIG. 10, an enlarged hole 208 is formed through plate 36 at one end of slot 40 and is located at the rear of the cut-off machine in a location where the cuttings are thrown toward it can fall through to the drawer. Metal cuttings in particular tend to cling together and frequently become caked or otherwise build up to bridge a gap. A large buildup of cuttings of that type can interfere with effective operation of the machine. Therefore, kicker means K is provided for moving upwardly and downwardly through hole 208 to prevent the build up of caked cuttings therein. In one arrangement, kicker means K includes a generally L-shaped arm having a finger 212 which moves upwardly and downwardly relative to hole 208. Obviously, many different arrangements may be provided for operating kicker means K. In one arrangement, kicker means K is spring-biased in a direction for moving finger 212 downwardly through hole 208. A bracket 214 suitably secured to the underside of plate 36 mounts kicker K for pivotal movement about a pivot axis 216. An arm member 218 is pivotally connected to kicker K by a pin 224 located below pivot pin 216. A spring 228 is connected between a bracket 229 and arm 218 normally biases arm 218 and kicker K to the position of FIG. 12. The lower portion of arm 218 extends loosely through a hole in bracket 230 attached to carrier 70 and threadedly receives a collar 232 which can be threadably adjusted along the lower portion of arm 218 and releasably locked in adjusted position as by a set screw. In the lowermost position of carrier 70, bracket 230 bears against collar 232 for holding kicker in a counterclockwise pivoted position of FIG. 11 with kicker finger 212 extending upwardly through hole 208 in plate 36. As carrier 70 moves upwardly, bracket 230 moves away from collar 232 and spring 228 causes kicker K tomove clockwise about its pivot 216. Arm 212 also moves downwardly as shown in FIG. 12. When carrier 70 again moves downwardly, its movement in the downwardly direction is quite rapid so that bracket 230 impacts collar 232 to swing kicker K counterclockwise with somewhat of a snap action. This moves finger 212 rapidly up through hole 208 for breaking up and throwing caked deposits therefrom. Bracket 230 and collar 232 define cooperating means on elongated arm 218 and elevating means 70 for moving kicker member K in a direction for moving finger 212 downwardly relative to hole 208 in response to initial raising movement of elevating means 70 and for moving kicker member K in a direction for moving finger 212 upwardly relative to hole 208 in response to final lowering movement of elevating means 70. Collar 232 defines an adjustable abutment which is secured to the lower end portion of elongated arm 218 for selective adjustment longitudinally therealong. Bracket 230 defines a fixed abutment on the elevating means for cooperation with adjustable abutment 232, and both abutments define part of the cooperating means for moving kicker member K in response to movement of elevating means 70. As best shown in FIG. 9, a suitable vertical slot 250 is formed through guard plate 158 for accommodating kicker K and its finger 212.

Figure 13:
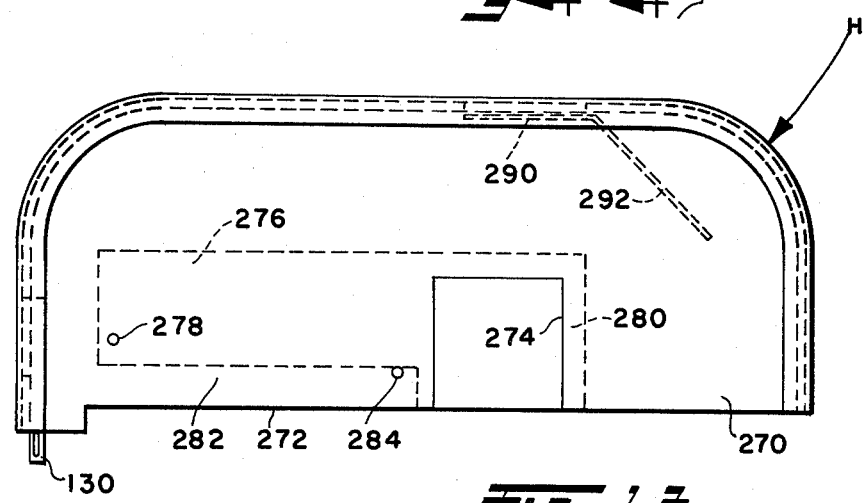
FIG. 13 is a side elevational view of a cover used on the machine of FIGS. 1 and 2.

FIG. 13 shows cover H as including opposite sides, only one of which is shown at 270, and includes a bottom side edge 272. Openings 274 are formed in the opposite sides of cover sidewalls 270 extending upwardly from bottom side edges 272 thereof. In the arrangement shown in FIG. 13, openings 274 are generally rectangular and are located substantially centrally of slot 40 in plate 36. Doors in the form of flat metal plates 276 are pivoted as at 278 to cover sides 270 and have end portions 280 completely closing opening 274. An edge 282 of plates 276 rests against a stop pin 284. Plate end portions 280 freely pivot upwardly for vertically varying the size of openings 274 to accommodate workpieces of various sizes. This arrangement minimizes the openings through cover H while allowing workpieces of various sizes to be extended through the opposite sides of the cover. Cover H also preferably includes a deflector and wear plate having an upper portion 290 welded to the inner surface of cover H in alignment with slot 40, and having a downwardly inclined portion 292. Sparks and cuttings thrown by cutting disc 42 will strike deflector 292 for preventing damage to cover H. Disintegration of a wheel will also cause particles to strike deflector portion 292 so there is little danger of such particles penetrating completely through both deflector portion 292 and the material of cover H.

FIG. 14 schematically shows a pneumatic control circuit for operating the device. Obviously, motor 140 is electric and is simply turned on by a suitable switch. Electric motor 140 may be of the variable speed type so that the speed of rotation of cutting disc 42 can be adjusted to the type of material being cut. Line 302 to the left of FIG. 14 has numbers 1-8 thereon representing the various lines of the pneumatic circuit. Supply line 303 is connected to a suitable source of high pressure air. Line 1 includes an adjustable pressure regulating valve 304 for adjusting the air pressure supplied through line 1 to double acting clamp cylinder G. A four-way has passages 306 and 308 respectively located in lines 1 and 6, and is controlled by push-pull button 310. Passages 306 and 308 selectively serve as pressure or exhaust passages. Passage 306 is shown serving as an exhaust passage open to atmosphere and passage 308 is shown serving as a pressure passage. A relay valve 312 in line 2 is also connected with line 1 and has normally open valve passage 312a in line 3. An adjustable pressure regulating valve 314 in line 3 is provided for selectively adjusting the air pressure provided to double acting cylinders B of the elevating means. A limit valve 320 in line 3 is normally open when slot blocking means J is in its blocking position and is cloed when slot blocking means J is in its unblocking position. Limit valve 322 in line 3 is its open position when cover H is in its open uncovering position, and is in its closed position when cover H is in its closed covering position. A four-way valve has pasages 324 and 328 respectively located in lines 3 and 4 selectively serving as exhaust or pressure passages. Passage 324 is shown serving as an exhaust passage open to atmosphere and passage 328 is shown serving as a pressure passage. The four-way valve having passages 324 and 328 is controlled by push-pull button 326. A limit valve 330 in line 5 is normally open and is momentarily closed by carrier 70 reaching its uppermost position. Limit valve 332 in line 6 is closed only when carrier 70 is in its lowermost position and is open at all other times. Push-pull button 340 of another four-way valve operates passages 342 in line 7 and 344 in line 8. Passage 342 is shown serving as an exhaust passage open to atmosphere and passage 344 is shown serving as a pressure passage.

In order to operate the device, valves 304 and 314 are suitably adjusted to provide the desired pressures to the clamping cylinders and the elevating cylinders. The motor is also turned on and its speed suitably adjusted. Button 310 is then pushed to change passage 306 from an exhaust passage to a pressure passage and operate clamp cylinders G and energize relay 312 for closing passage 312a in line 3. Push button 340 is also pushed to change passage 342 to a pressure passage for operating cylinder 134 to close cover H, and operating cylinder 194 to swing slot blocking means J to its unblocking position. This movement of clover H and blocking means J closes limit valves 320 and 322 in line 3. Operation of push button 326 will then change passage 324 to a pressure passage for supplying compressed air to cylinders B for elevating carrier 70. Once carrier 70 starts moving upwardly, limit valve 332 opens so that air pressure is no longer available through line 8 to cover cylinders 134 or blocking means cylinder 194 so that these cylinders cannot be operated in a direction to open the cover or move the slot blocking means to its blocking position. Likewise, pneumatic pressure is not available through line 6 to the other side of clamp cylinders G so they cannot be unclamped. Even though cover H may be spring biased upwardly, the presence of air pressure to cover cylinder 134 through line 7 and passage 342 holds the cover in a closed position. The spring aids the cylinders in raising the cover and holds same open until it is positively closed by operation of the cylinders. Once carrier means 70 reaches its uppermost position, limit valve 330 in line 5 closes sending a pressure signal which acts against button 326 for moving same upwardly in FIG. 14 to open valve 324 in line 3 and close valve 328 in line 4. This reverses cylinders B for the elevating means so that carrier 70 begins moving downwardly. Once carrier 70 is fully down, limit valve 332 is again closed. Pulling on button 310 will then allow pressure through line 6 to the other side of clamp cylinders G for releasing same, and pulling on button 340 will allow pneumatic pressure through line 8 to the other side of cylinders 134 and 194 to open cover H and move blocking means J to its blocking position. Button 326 may be considered selectively operable elevating control means for selectively moving the elevating means defined by carrier 70 in its raising or lowering directions. As explained, this elevating control means 326 is inoperative to move the elevating means in its raising direction unless all of passages or valves 321a, 320 and 322 are in positions providing flow of air through line 3. These valves or passages in effect define safety control means which prevent operation of the elevating means unless the cover, clamp means and blocking means are all in their proper positions. This is the first position as previously defined in the specification for the cover, clamp means and slot blocking means. If any of these devices are in their second position, one of valves or passages 312a, 320 or 322 will be open so that the elevating means cannot be operated to move the elevating means in its raising direction. The piston of valves or passages 312a, 320 and 322 is immaterial for lowering movement of the elevating means because elevating cylinders B are supplied directly through line 4 for lowering the elevating means and air is exhausted from the other side of these cylinders through passage 324.

Limit valve 332 defines position control means which is in its open position when the elevating means is out of its lowermost position and is in its closed position when the elevating means is in its lowermost position. In its open position, this position control means prevents movement of the clamp means and the cover to their second position.

Limit valve 330 is suitably mounted on a bracket 331 attached to carrier 70 as shown in FIG. 1. An operating member for valve 330 pivots toward and away from the plane of the paper and carries a roller 333 defining a cam follower which is acted upon by a lower end portion 335 of elongated threaded rod 337 which is threaded through a tapped hole in plate 36. Rod 337 and valve 330 define adjustable automatic reversing means for adjusting the distance carrier 70 and disc 42 are elevated before the air supply to cylinders B is reversed for moving carrier 70 back downwardly. The lower end portion 335 of rod 337 is shaped like an inverted truncated cone and the centerline of rod 337 is displaced from the pivot axis of roller 333 so that a peripheral portion of roller 333 away from top dead center will strike an inclined surface or rod lower end portion 335. Manual rotation of rod 337 varies the location of lower end 335 relative to roller 333 to vary the elevating movement of disc 42 before automatic reversal takes place.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

Having thus decribed our invention, we claim:

1. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, selectively operable clamp means movable between first and second positions respectively corresponding to clamping and unclamping positions for selectively clamping workpieces on said top surface, selectively operable cover means movable between first and second positions respectively corresponding to covering and uncovering positions for selectively covering said clamp means and said slot in outwardly-spaced surrounding relationship thereto, selectively operable elevating control means for controlling operation of said elevating means, safety control means movable between closed and open positions for respectively permitting and preventing operation of said elevating means, said safety control means being automatically moved between said closed and open positions by movement of said clamp means and cover means between said first and second positions so that said selectively operable elevating control means is operative to actuate said elevating means for moving said cutting disc in said raising direction through said slot only when said clamp means and cover means are in said first positions, said elevating means being movable in said raising direction from a lowermost position, and position control means movable between open and closed positions for respectively preventing movement of said clamp means and cover means to said second positions from said first positions thereof and permitting movement of said clamp means and cover means to said second positions from said first positions thereof, and said position control means being in said closed position when said elevating means is in said lowermost position and being in said open position when said elevating means is out of said lowermost position.

2. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, selectively operable slot blocking means movable between first and second positions respectively corresponding to unblocking and blocking positions for selectively blocking said slot against movement of said cutting disc therethrough in said raising direction, selectively operable elevating control means for controlling operation of said elevating means, safety control means movable between closed and open positions for respectively permitting and preventing operation of said elevating means, and said safety control means being automatically moved between said first and second positions so that said selectively operable elevating control means is operative to actuating said elevating means for moving said cutting disc in said raising direction through said slot only when said blocking means is in said first position.

3. The machine of claim 2 wherein said blocking means comprises an elongated blocking member having a generally L-shaped cross-sectional configuration including a generally horizontal leg portion and a generally vertical leg portion, said vertical leg portion being pivoted on an axis extending parallel to said slot for pivotal movement of said blocking member to locate said horizontal leg directly beneath said slot in said blocking position of said blocking means and to one side of said slot in said unblocking position of said blocking means.

4. The machine of claim 2 including cover means movable between first and second positions respectively corresponding to covering and uncovering positions for selectively covering said top surface and slot in outwardly-spaced surrounding relationship thereto, and common control means for simultaneously moving said blocking means and said cover means between said first and second positions.

5. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, a plurality of spaced-apart vertical rods attached beneath said top surface on one side of said slot, said elevating means including a carrier for said cutting disc mounted on said rods for raising and lowering movement, said carrier including fluid cylinders surrounding at least certain of said rods, said certain rods having pistons fixed thereto within said cylinders, and pressurized fluid feed means for selectively feeding pressurized fluid to said cylinders on either side of said pistons while bleeding fluid from the other side thereof.

6. The machine of claim 5 wherein said fluid cylinders comprise pneumatic cylinders and further including hydraulic damping means between said carrier and another of said rods.

7. The machine of claim 6 wherein said damping mans also defines adjustable elevating rate control means for adjustably controlling the rate at which said elevating means is moved in said raising direction by operation of said fluid cylinders.

8. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, an enlarged hole through said top surface at one end of said slot, said disc being rotatable in a direction for throwing cuttings toward said hole, and kicker means movable upwardly and downwardly through said hole for breaking up cuttings caked in said hole.

9. The machine of claim 8 wherein said kicker means moves downwardly in said hole responsive to raising movement of said elevating means and moves upwardly in said hole responsive to lowering movement of said elevating means.

10. The machine of claim 8 wherein said kicker means is spring biased for movement downwardly out of said hole.

11. The machine of claim 8 wherein said kicker means includes a pivotally mounted kicker member having a finger and being pivotally movable for moving said finger upwardly and downwardly through said hole, an elongated arm connected with said kicker member and extending downwardly therefrom, and cooperating means between said elongated arm and said elevating means for moving said kicker member in a direction for moving said finger downwardly relative to said hole in response to initial raising movement of said elevating means and for moving said kicker member in a direction for moving said finger upwardly relative to said hole in response to final lowering movement of said elevating means.

12. The machine of claim 11 wherein said arm has a lower end portion and said cooperating means includes an adjustable abutment secured to said lower end portion and selectively adjustably movable longitudinally therealong, said cooperating means including a fixed abutment on said elevating means cooperable with said adjustable abutment.

13. The machine of claim 11 including a spring normally biasing said kicker member in a direction for moving said finger downwardly relative to said hole.

14. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, selectively operable clamp means movable between first and second positions respectively corresponding to clamping and unclamping positions for selectively clamping workpieces on said top surface, selectively operable cover means movable between first and second positions respectively corresponding to covering and uncovering positions for selectively covering said clamp means and said slot in outwardly-spaced surrounding relationship thereto, selectively operable elevating control means for controlling operation of said elevating means, safety control means movable between closed and open positions for respectively permitting and preventing operation of said elevating means, said safety control means being automatically moved between said closed and open positions by movement of said clamp means and cover means between said first and second positions so that said selectively operable elevating control means is operative to actuate said elevating means for moving said cutting disc in said raising direction through said slot only when said clamp means and cover means are in said first positions, and selectively operable slot blocking means movable between first and second positions respectively corresponding to unblocking and blocking positions for selectively blocking said slot against movement of said cutting disc therethrough in said raising direction.

15. The machine of claim 14 wherein said safety control means is automatically moved between said closed and open positions by movement of all said clamp means, cover means and blocking means between said first and second positions so that said selectively operable elevating control means is operative to actuate said elevating means for moving said cutting disc in said raising direction through said slot only when all of said clamp means, cover means and blocking means are in said first positions.

16. The machine of claim 15 wherein said safety control means comprises an individual safety control device operative between closed and open positions by each of said clamp means, cover means and blocking means.

17. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, selectively operable clamp means movable between first and second positions respectively corresponding to clamping and unclamping positions for selectively clamping workpieces on said top surface, selectively operable cover means movable between first and second positions respectively corresponding to covering and uncovering positions for selectively covering said clamp means and said slot in outwardly-spaced surrounding relationship thereto, selectively operable elevating control means for controlling operation of said elevating means, safety control means movable between closed and open positions for respectively permitting and preventing operation of said elevating means, said safety control means being automatically moved between said closed and open positions by movement of said clamp means and cover means between said first and second positions so that said selectively operable elevating control means is operative to actuate said elevating means for moving said cutting disc in said raising direction through said slot only when said clamp means and cover means are in said first positions, said cover having opposite sides located on opposite sides of said slot and said sides having bottom side edges, workpiece openings in said opposite sides extending upwardly from said bottom side edges, and upwardly movable doors for closing said openings and varying the height thereof.

18. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, selectively operable clamp means movable between first and second positions respectively corresponding to clamping and unclamping positions for selectively clamping workpieces on said top surface, selectively operable cover means movable between first and second positions respectively corresponding to covering and uncovering positions for selectively covering said clamp means and said slot in outwardly-spaced surrounding relationship thereto, selectively operable elevating control means for controlling operation of said elevating means, safety control means movable between closed and open positions for respectively permitting and preventing operation of said elevating means, said safety control means being automatically moved between said closed and open positions by movement of said clamp means and cover means between said first and second positions so that said selectively operable elevating control means is operative to actuate said elevating means for moving said cutting disc in said raising direction through said slot only when said clamp means and cover means are in said first positions, said housing including a housing base and said top surface being on a plate which is rotatably adjustable about a vertical plate axis, a plurality of spaced-apart vertical rods attached to said plate on one side of said slot within said housing and extending downwardly to terminal bottom rod ends spaced above said base, rod connecting means for connecting said bottom rod ends to maintain said rods in spaced-apart parallel relationship, said elevating means including a carrier for said cutting disc, said carrier including fluid cylinders surrounding at least certain of said rods, and said certain rods having pistons fixed thereto within said cylinders.

19. The machine of claim 18 wherein said fluid cylinders comprise pneumatic cylinders and further including hydraulic damping means between said carrier and another of said rods.

20. The machine of claim 19 wherein said damping means also defines adjustable elevating rate control means for adjustably controlling the rate at which said elevating means is moved in said raising direction by operation of said pneumatic cylinders.

21. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, selectively operable clamp means movable between first and second positions respectively corresponding to clamping and unclamping positions for selectively clamping workpieces on said top surface, selectively operable cover means movable between first and second positions respectively corresponding to covering and uncovering positions for selectively covering said clamp means and said slot in outwardly-spaced surrounding relationship thereto, selectively operable elevating control means for controlling operation of said elevating means, safety control means movable between closed and open positions for respectively permitting and preventing operation of said elevating means, said safety control means being automatically moved between said closed and open positions by movement of said clamp means and cover means between said first and second positions so that said selectively operable elevating control means is operative to actuate said elevating means for moving said cutting disc in said raising direction through said slot only when said clamp means and cover means are in said first positions, said clamp means including a generally L-shaped clamp support having a generally horizontal leg secured to said top surface and an upright leg extending upwardly therefrom, said clamp support being located with said upright leg extending across said slot adjacent one end thereof, an upwardly extending vertical opening in said upright leg aligned with said slot for accommodating said cutting disc when said cutting disc is moved upwardly through said slot, clamp arms pivotally connected to said clamp support on opposite sides of said slot and having forward end portions extending outwardly from said upright leg for movement toward and away from said top surface, said clamp arms having rear end portions located on the opposite side of said upright leg from said forward end portions, and fluid clamp cylinders connected between said horizontal leg and said rear end portions for pivoting said arms to selectively move said forward end portions toward and away from said top surface.

22. The machine of claim 21 wherein said arms are pivotally connected to said clamp support by arm pivot connections and said pivot connections are adjustable vertically and horizontally for selectively varying the location of said forward end portions and their movement path.

23. The machine of claim 21 including spark guard means positioned between said disc and at least one of said clamp cylinders for protecting same from flying sparks.

24. The machine of claim 23 including spark deflector means positioned on said clamp support between said disc and said cover.

25. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, selectively operable clamp means movable between first and second positions respectively corresponding to clamping and unclamping positions for selectively clamping workpieces on said top surface, selectively operable cover means movable between first and second positions respectively corresponding to covering and uncovering positions for selectively covering said clamp means and said slot in outwardly-spaced surrounding relationship thereto, selectively operable elevating control means for controlling operation of said elevating means, safety control means movable between closed and open positions for respectively permitting and preventing operation of said elevating means, said safety control means being automatically moved between said closed and open positions by movement of said clamp means and cover means between said first and second positions so that said selectively operable elevating control means is operative to actuate said elevating means for moving said cutting disc in said raising direction through said slot only when said clamp means and cover means are in said first positions, said top surface having an enlarged hole therethrough at one end of said slot, and said cutting disc being rotatable in a direction for throwing cut material toward said hole.

26. The machine of claim 25 including kicker means mounted beneath said top surface and being movable upwardly through said hole for breaking loose caked material in said hole.

27. The machine of claim 26 wherein said kicker means comprises a kicker arm pivotally mounted beneath said surface and having a finger movable upwardly and downwardly through said hole.

28. The machine of claim 27 wherein said kicker arm is spring biased for movement in a direction to move said finger downwardly out of said hole, and kicker operating means on said elevating means for moving said kicker arm in a direction for moving said finger upwardly into said hole when said elevating means nears its limit of movement in said lowering direction, and said spring means being operative for moving said arm in a direction for movement of said finger downwardly out of said hole when said elevating means is leaving its lowermost position in said raising direction.

29. A cut-off machine or the like comprising; a housing including a top surface having a slot therethrough, a rotatable cutting disc movable through said slot, a cover pivotally connected with said housing for movement between covering and uncovering positions for selectively covering said slot in outwardly-spaced surrounding relationship thereto, said cover having opposite cover sides located on opposite sides of said slot and having bottom side edges positioned closely adjacent said top surface in said covering position thereof, workpiece openings in said opposite cover sides extending upwardly from said bottom side edges, and upwardly movable doors for closing said openings and varying the height thereof.

30. A cut-off machine or the like comprising; a housing including a top surface having a slot therethrough, a rotatable cutting disc mounted within said housing for movement in raising and lowering directions through said slot, selectively operable elevating means for moving said disc in said raising and lowering directions, clamp means for selectively clamping workpieces on said top surface, said clamp means including a generally L-shaped clamp support having a generally horizontal leg secured to said top surface and an upright leg extending upwardly therefrom, said clamp support being located with said upright leg extending across said slot adjacent one end thereof, an upwardly extending vertical opening in said upright leg aligned with said slot for accommodating said cutting disc when said cutting disc is moved upwardly through said slot, clamp arms pivotally connected to said clamp support on opposite sides of said slot and having forward end portions extending outwardly from said upright leg for movement toward and away from said top surface, said clamp arms having rear end portions located on the opposite side of said upright leg from said forward end portions, and fluid clamp cylinders connected between said horizontal leg and said rear end portions for pivoting said arms to selectively move said forward end portions toward and away from said top surface.

31. A cut-off machine or the like comprising a housing including a top surface having a slot therethrough, a rotatable cutting disc mounted within said housing for movement in raising and lowering directions through said slot; selectively operable pneumatic elevating means for moving said disc in said raising and lowering directions; and, adjustable hydraulic elevating rate control means for adjustably controlling the rate of movement of said elevating means in said raising direction, said elevating rate control means including a hydraulic cylinder having a piston and including an accumulator connected by first and second conduits with said cylinder on opposite sides of said piston, an adjustable valve and a check valve positioned in said first conduit in parallel with one another for providing flow through said first conduit in a direction from said hydraulic cylinder to said accumulator only through said adjustable valve and for freely passing hydraulic fluid in the same direction through said check valve.

32. A cut-off machine or the like comprising: a housing including a top surface having a slot therethrough; a rotatable cutting disc mounted within said housing for movement in raising and lowering directions through said slot; selectively operable elevating means for moving said disc in said raising and lowering directions; automatic reversing means operative during movement of said elevating means in said raising direction for automatically reversing same for movement in said lowering direction, said reversing means including a reversing control carried by said elevating means; and, adjustable means mounted on said housing and being accessible externally of said housing for adjusting the distance said elevating means moves in said raising direction before operation of said automatic reversing means, said adjustable means including an elongated rod threaded through a hole in said housing top surface with an end portion thereof engageable with said reversing control, said rod being rotatable for varying the distance between said rod end portion and said reversing control when said elevating means is in its lowermost position.

* * * * *